United States Patent
Dort et al.

(10) Patent No.: US 11,782,130 B2
(45) Date of Patent: Oct. 10, 2023

(54) TOF SENSOR WITH TEST EMITTER

(71) Applicant: CEDES AG, Landquart (CH)

(72) Inventors: Marcel Dort, Flums (CH); Philipp Triet, Bad Ragaz (CH); Jürg Hegelbach, Kriesern (CH)

(73) Assignee: CEDES AG, Landquart (CH)

( * ) Notice: Subject to any disclaimer, the term of this patent is extended or adjusted under 35 U.S.C. 154(b) by 1049 days.

(21) Appl. No.: 16/266,334

(22) Filed: Feb. 4, 2019

(65) Prior Publication Data
US 2019/0242995 A1    Aug. 8, 2019

(30) Foreign Application Priority Data

Feb. 8, 2018   (EP) ..................................... 18155750

(51) Int. Cl.
*G01S 7/481* (2006.01)
*G01S 7/497* (2006.01)
(Continued)

(52) U.S. Cl.
CPC ........... *G01S 7/4811* (2013.01); *G01S 7/4813* (2013.01); *G01S 7/497* (2013.01); *G01S 7/4915* (2013.01);
(Continued)

(58) Field of Classification Search
CPC .......... G01S 17/10; G01S 17/32; G01S 17/36; G01S 17/894; G01S 7/4811;
(Continued)

(56) References Cited

U.S. PATENT DOCUMENTS

| 4,699,508 A | 10/1987 | Bölkow et al. |
| 5,867,125 A * | 2/1999 | Cluff ....................... G01S 1/045 367/125 |

(Continued)

FOREIGN PATENT DOCUMENTS

| CN | 102741651 A | 10/2012 |
| CN | 103257032 A | 8/2013 |

(Continued)

OTHER PUBLICATIONS

Chinese Office Action (Application No. 201910108567.3) dated Dec. 3, 2021 (with English translation).

(Continued)

*Primary Examiner* — Luke D Ratcliffe
(74) *Attorney, Agent, or Firm* — BURR PATENT LAW, PLLC

(57) ABSTRACT

A sensor for monitoring a monitoring area having a transmitter for transmitting radiation into the monitoring area for reflection at an object in the monitoring area, a test transmitter for transmitting a test signal comprising radiation, a receiver for receiving the radiation of the transmitter that is reflected at the object or the radiation of the test transmitter, and an evaluation device for ascertaining a distance value on the basis of the delay in the transit time or the phase of a modulation between the transmitted and received radiation of the sensor. The sensor further comprises a memory for storing an expectation value for the expected distance value of the received test signal, and a comparison device for comparing a distance value on the basis of the received test signal with the expectation value and for outputting a safety signal on the basis of the comparison.

16 Claims, 2 Drawing Sheets

(51) Int. Cl.
    *G01S 17/10*     (2020.01)
    *G01S 17/32*     (2020.01)
    *G01S 7/4915*    (2020.01)
    *G08B 13/187*    (2006.01)
    *G01S 17/36*     (2006.01)
    *G01S 17/04*     (2020.01)
    *G01S 17/894*    (2020.01)

(52) U.S. Cl.
    CPC ............. *G01S 17/04* (2020.01); *G01S 17/10* (2013.01); *G01S 17/32* (2013.01); *G01S 17/36* (2013.01); *G01S 17/894* (2020.01); *G08B 13/187* (2013.01)

(58) Field of Classification Search
    CPC ...... G01S 7/4813; G01S 7/4915; G01S 7/497; G01S 17/04; G01S 17/89; G01S 2007/4975; G01S 7/4911; G01S 17/42; G01S 7/4817; G08B 13/187; H04N 5/2256
    See application file for complete search history.

(56) References Cited

U.S. PATENT DOCUMENTS

| | | |
|---|---|---|
| 7,821,618 B2 | 10/2010 | Reime |
| 2002/0171848 A1 | 11/2002 | Tomita et al. |
| 2005/0265596 A1 | 12/2005 | Lohmann |
| 2007/0091294 A1 | 4/2007 | Hipp |
| 2008/0285842 A1 | 11/2008 | Plasberg et al. |
| 2011/0188027 A1 | 8/2011 | Bamji |
| 2012/0026294 A1 | 2/2012 | Rothenberger et al. |
| 2013/0120565 A1* | 5/2013 | Wilks ............... G01S 7/4911 348/135 |
| 2013/0214167 A1 | 8/2013 | Grinberg et al. |
| 2013/0301030 A1* | 11/2013 | Hulm ............... G01S 7/4861 356/4.01 |
| 2014/0362364 A1 | 12/2014 | Waligorski |
| 2015/0285912 A1* | 10/2015 | Hammes ............ G01S 7/4817 250/221 |
| 2015/0356747 A1 | 12/2015 | Dielacher et al. |
| 2016/0041264 A1* | 2/2016 | Dielacher ........... G01S 17/36 356/5.01 |

FOREIGN PATENT DOCUMENTS

| | | |
|---|---|---|
| DE | 32 19 423 A1 | 12/1982 |
| DE | 199 36 441 A1 | 3/2001 |
| DE | 101 04 418 A1 | 8/2002 |
| DE | 10 2005 045 993 A1 | 2/2007 |
| DE | 10 2010 036 775 A1 | 2/2012 |
| DE | 10 2015 108 825 A1 | 12/2015 |
| DE | 10 2014 111 431 A1 | 2/2016 |
| EP | 1 522 870 A1 | 4/2005 |
| EP | 1 548 351 A2 | 6/2005 |
| EP | 1 876 468 A1 | 1/2008 |
| EP | 1 927 867 A1 | 6/2008 |
| EP | 2 202 994 A1 | 6/2010 |
| EP | 2 597 482 A1 | 5/2013 |
| EP | 2 453 260 | 4/2014 |
| EP | 2 927 711 A1 | 10/2015 |
| EP | 3 156 824 A1 | 4/2017 |
| EP | 2 598 906 B1 | 10/2017 |
| JP | 2002-296008 A | 10/2002 |
| JP | 2006-064641 A | 3/2006 |
| JP | 2010-175278 A | 8/2010 |
| JP | 2014-179762 A | 9/2014 |
| JP | 2017-032342 A | 2/2017 |

OTHER PUBLICATIONS

European Search Report (Application No. 18155750.5) dated Jul. 27, 2018.

European Opposition Papers (Application No. 18155750.5) dated Jul. 21, 2021.

Japanese Office Action (with English translation) dated Oct. 11, 2022 (Application No. 2019-021955).

European Office Action dated Sep. 19, 2022 (Application No. 18155750.5).

Chinese Office Action (with English translation) dated Jul. 29, 2022 (Application No. 201910108567.3).

* cited by examiner

TOF SENSOR WITH TEST EMITTER

FIELD OF THE INVENTION

The present invention relates to a sensor for monitoring a monitoring area having a test transmitter for checking the sensor.

BACKGROUND OF THE INVENTION

Sensors of the cited type are known from the prior art. The patent EP 2 453 260 B1 from the applicant discloses such a sensor in which a second transmitter applies a test signal to the receiver of the sensor and the sensor uses the received radiation intensity to check its state.

SUMMARY OF THE INVENTION

It is an object of the present invention to provide an improved sensor of the cited type.

The sensor according to the present invention is a sensor for monitoring a monitoring area having a transmitter, a test transmitter, a receiver, an evaluation device, a memory and having a comparison device.

The cited units are functional units. The devices of the sensor can be delimited from one another, merge into one another or contain one another. The devices or parts of the devices can be realized inside or else outside the housing of the sensor.

The transmitter is designed to transmit radiation into the monitoring area, which radiation is partially reflected to the sensor again after reflection at an object in the monitoring area. The test transmitter is configured for transmitting a test signal comprising radiation. The receiver is configured for receiving the radiation of the transmitter, reflected at one or more objects in the monitoring area, and for receiving the radiation of the test transmitter. In this case, the transmitter can also be designed to condition or process the received signal in a certain manner already. The evaluation device is configured for ascertaining a distance value on the basis of the transit-time delay or the phase delay of a modulation between the radiation transmitted by the transmitter or test transmitter and the radiation received by the receiver. The memory is configured for storing an expectation value for the expected distance value of the test signal to be received. The comparison device is configured for comparing a distance value on the basis of a test signal received by the receiver with the expectation value and for outputting a safety signal on the basis of the comparison.

The comparison device can be configured to output the safety signal if the distance value from the received test signal differs from the expectation value by a tolerance value or more.

The comparison device can be designed to take on the distance value from the received test signal from the evaluation device or to form this value on the basis of the output signal of the receiver itself. The test transmitter and/or the memory and/or the comparison device can together be in the form of a self-test device.

This sensor can produce the advantage that the sensor can check several of its functional units. This sensor can produce the advantage that it can check the correct operation of the receiver and/or the correct operation of the evaluation device.

Preferably, the test transmitter is arranged for irradiating the receiver over an invariable distance. That is to say that there is no reflection at moving objects, which could alter the beam path. This can produce the advantage that the receiver always undergoes the same irradiation by the test transmitter and this same irradiation can be compared with the expectation value more easily.

Preferably, the test transmitter is arranged for directly irradiating the receiver or for irradiation by means of invariable reflection. Preferably, the test transmitter is arranged for irradiating the receiver by means of reflection at one or more surfaces inside the housing of the sensor. Preferably, the test transmitter, the receiver and the receiver optical system are arranged such that the radiation of the test transmitter is reflected by interfaces between the receiver optical system and the receiver, in particular, by the outer lens surface of the receiver optical system, which surface faces the receiver. Preferably, the test transmitter and the receiver are surrounded completely by the housing and elements that shut off the housing.

Preferably, the radiation of the transmitter and/or of the test transmitter is modulated, in particular intensity modulated, in particular modulated with 20 MHz. This can produce the advantage that the receiver and the evaluation device can receive and evaluate the phase delay of the modulated intensity between the transmission by the transmitter and/or the test transmitter and the receiver. This principle is also called time of flight (TOF).

Preferably, the radiation is an IR radiation. As a result, the radiation is invisible and thus not irritating to people.

Preferably, the sensor is designed to have a device for synchronization between, firstly, the transmitter and/or test transmitter and, secondly, the receiver, which device synchronizes the modulation and/or a pattern of the modulation and/or another pattern of the radiation of the transmitter and/or of the test transmitter with the receiver or synchronizes it/them with a particular time delay. This can produce the advantage that the phase delay between the transmitted and received light can be ascertained more easily. Another pattern of the radiation can be the time at which the radiation begins.

Preferably, the sensor is designed to have a device for synchronization between the test transmitter and the receiver, which device synchronizes the modulation and/or a pattern of the modulation and/or another pattern of the radiation of the test transmitter with the receiver with a particular time delay that differs from the synchronization between the transmitter and the receiver. In particular, the time delay of the synchronization between the test transmitter and the receiver can be longer than the time delay between the transmitter and the receiver. This can also easily be effected by means of other switching times of the assemblies of the actuation electronics for the test transmitter. In particular, the trigger of the synchronization can reach the test transmitter later than the receiver. This simulates a time of flight for the radiation from the test transmitter to the receiver that is longer by the time delay. This can produce the advantage that the expectation value is provided with a value that is easier to process and in particular corresponds to a surface at a mean distance in relation to the monitoring area.

Preferably, the receiver is in the form of receiver matrix having receiver matrix elements for receiving individual image element points and, in particular, for recording a 3D image. This can produce the advantage that the monitoring area can be monitored in detail.

Preferably, the evaluation device is designed to ascertains a value for individual or all receiver elements or in each case groups of receiver elements, in particular, in order to ascertain a 3D image. This can produce the advantage that the monitoring area can be monitored in detail.

Preferably, the sensor is designed so that the expectation value is ascertained by means of the single or repeated reception of radiation of the test transmitter, and is ascertained, in particular, by the evaluation device, and corresponds, in particular, to a value or a function of multiple values of the evaluation device on reception of one or more test signals by the receiver, in particular, to an averaging. This can produce the advantage that the stipulation of the expectation value is facilitated and/or has its accuracy improved.

Preferably, the sensor is designed so that the expectation value has a minimum value and a maximum value or a mean value with a difference value (threshold value), and has, in particular, single values for some or each or groups of receiver matrix elements, and represents, in particular, the shape of a surface and, in particular, of a plane or of a section of space that is bounded by two surfaces or planes. This can have the advantage that the expectation value is of a type that corresponds to the value or the image that the evaluation device outputs from the test signal. This can have the advantage that the expectation value is more easily comparable with the value from the received test signal.

Preferably, the sensor is designed for activating the test transmitter instead of the transmitter. This can produce the advantage that the transmitter does not disturb the receiver when it is receiving the test signal of the test transmitter.

Preferably, the sensor is designed for activating the test transmitter by means of an activation signal.

Preferably, the sensor is designed for periodically activating the test transmitter, in particular every 100 milliseconds. This can have the advantage that the sensor always operates correctly or is deactivated according to the safety signal.

Preferably, the sensor is designed for monitoring the opening area or a surrounding area of a door or gate.

Further features of the present invention are specified in the drawings.

BRIEF DESCRIPTION OF THE DRAWINGS

Exemplary embodiments of the present invention are depicted in the drawings and are explained in more detail below. Identical reference signs in the individual figures denote mutually corresponding elements in this case.

DETAILED DESCRIPTION OF THE INVENTION

Figure 1:
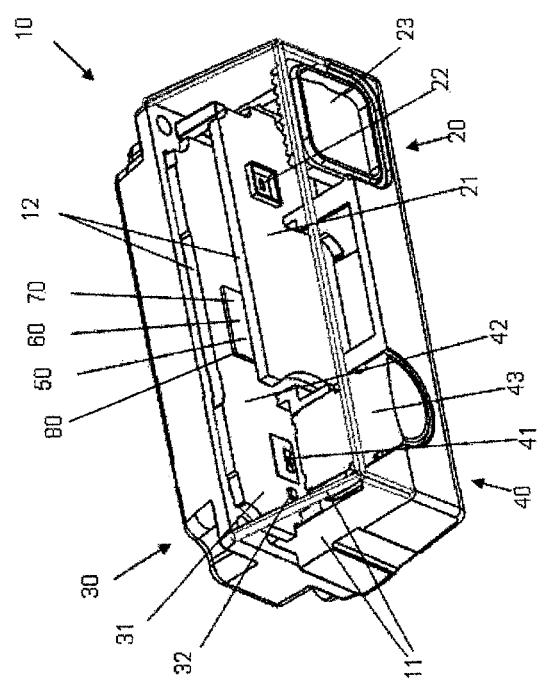
FIG. 1 shows a 3D view of a sensor according to the present invention.

FIG. 1 shows a partially cut-away 3D view of a sensor 10 according to the present invention.

The sensor has a housing 11, on the inside of which there are circuit boards 12. Arranged inside the housing are a transmitter 20, a test transmitter 30, a receiver 40, an evaluation device 50, a memory 60, a comparison device 70 and a synchronization device 80.

The transmitter 20 comprises one or three VCSEL semiconductor lasers 22 on one of the circuit boards 12, the laser being actuated by transmission electronics 21, not depicted, on a circuit board 12 and radiating its radiation through a transmitter optical system 22 into a monitoring space in front of the sensor.

The transmitter electronics actuate the VCSEL semiconductor laser such that it transmits an intensity-modulated radiation at the modulation frequency of 20 MHz. The light wavelength of the VCSEL semiconductor laser is infrared.

The test transmitter 30 comprises an LED 32 on one of the circuit boards 12, which is actuated by test transmitter electronics 31, not depicted, on one of the circuit boards 12. The test transmitter electronics actuate the LED such that the LED transmits intensity-modulated radiation at the same modulation frequency as in the case of the transmitter as a test signal. The light wavelength of the LED is infrared similarly to the light wavelength of the VCSEL.

The synchronization device 80 is arranged on one of the circuit boards 12 and depicted only symbolically. The synchronization device is designed to output a signal or a signal train to the transmitter or test transmitter and the receiver in order to synchronize the receiver with the modulation of the radiation of the transmitter, so that the receiver can ascertain the phase shift in the radiation between the transmitter and the receiver. As a result of other switching times of the assemblies of the actuation electronics, the synchronization signal reaches the test transmitter later than the receiver by a time delay.

The receiver 40 comprises a sensor chip 41 on one of the circuit boards 12, which sensor chip is actuated and read by receiver electronics 42, not depicted, and receives reflected radiation of the transmitter through the receiver optical system 43 from the monitoring space in front of the sensor. The sensor chip 41 is a sensor matrix having sensor pixels arranged in matrix form. The sensor pixels are two-tap demodulation pixels. The receiver picks up the signal of the synchronization device 80 and synchronizes the sensor pixels with the modulation of the radiation transmitted by the transmitter or test transmitter. In this manner, the sensor chip is designed to output for each sensor pixel an output signal that corresponds to the phase difference between the radiation output by the transmitter or test transmitter and the radiation received by the receiver.

The evaluation device 50 is arranged on one of the circuit boards 12 and depicted only symbolically. The evaluation device accepts the output signal of the receiver for each sensor pixel and calculates therefrom a distance value for each pixel, which corresponds to the distance of that object mapped by the pixel in the monitoring space that reflects the radiation of the transmitter back to the receiver. As such, the evaluation device calculates a 3D map of the monitoring space, which represents the distance of the mapped objects in scale portions or in millimeters. In the case of irradiation by the test transmitter, the transmitter stops and the evaluation device calculates a 3D surface that, on the basis of the time delay, virtually corresponds to a mean interval in the monitoring space. This 3D map is the surface detected by the sensor, that is to say a 3D surface. In the case of a sensor matrix, this surface can be the distance value that the evaluation device ascertains.

The evaluation device is designed to output a control signal if one of the distance values associated with the sensor pixels is below a particular threshold value.

The memory 60 is arranged on one of the circuit boards 12 and depicted only symbolically. The memory contains a particular distance value. The expectation value can be a distance or a surface at a particular distance or a 3D map.

The comparison device 70 arranged on one of the circuit boards 12 and depicted only symbolically. The comparison device is designed to compare the distance values measured by the receiver and calculated by the evaluation device with the expectation value of the memory during irradiation with a test signal by the test transmitter and to output a safety signal on the basis of this comparison. In particular, the comparison device outputs the safety signal if the evaluation device does not output a 3D map that corresponds to the 3D map of the expectation value, within particular threshold values, for the case of the test signal.

Figure 2:
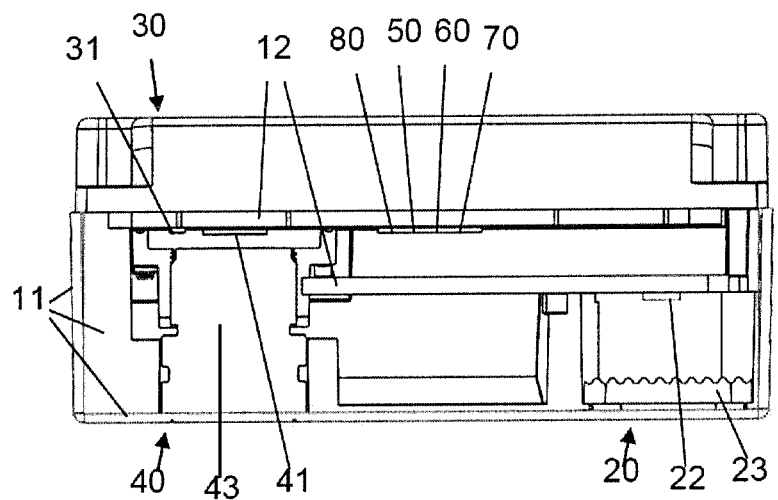
FIG. 2 shows a section through the sensor of FIG. 1.
Figure 3:
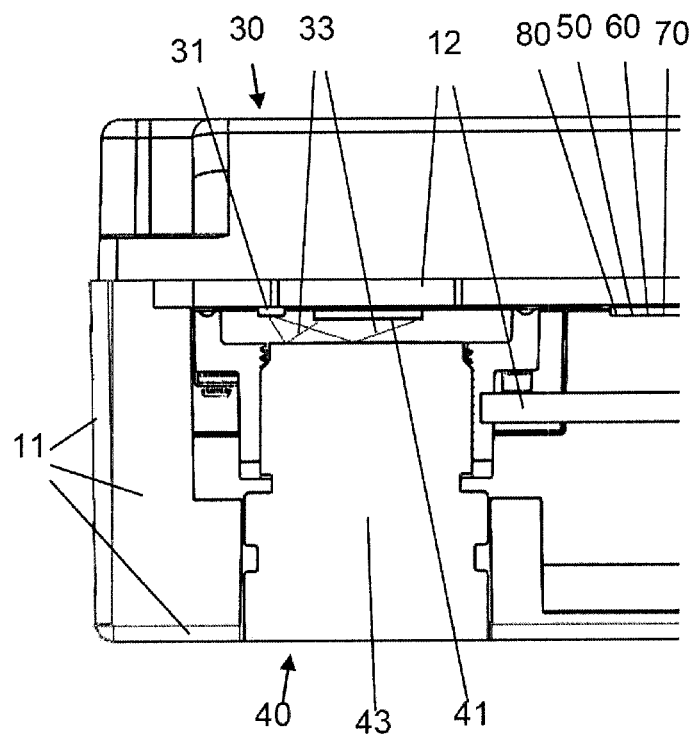
FIG. 3 shows a detail from the section of FIG. 2.

FIG. 2 shows a section through the sensor of FIG. 1 in order to be able to more easily associate the detail of FIG. 3 in the area of the test transmitter 30 and of the receiver 40.

FIG. 3 shows a detail from the section of FIG. 2 with the beam path 33 of the LED 31 of the test transmitter 30.

The LED 31 of the test transmitter 30 is arranged in physical proximity to the sensor chip 41 of the receiver 40 on the same circuit board 12 as the sensor chip. The receiver optical system 43 of the receiver 40 shuts off the housing 11 of the sensor 10 from the outside. The LED 31 of the test transmitter 30 and the sensor chip of the receiver are not physically shut off from one another and are completely surrounded in rigid fashion by the housing and the receiver optical system shutting off the housing.

The LED 31 of the test transmitter 30 transmits radiation for the test signal, which radiation, as depicted in the beam path 33, is reflected in the direction of the sensor chip 41 of the receiver 40 at the surface of the transmitter optical system 43 that points in the direction of the sensor chip 41. The LED, the transmitter optical system and the sensor chip are firmly connected to one another, which means that the beam path between the LED and the sensor chip does not change.

The synchronization device 80 synchronizes the receiver with the test transmitter analogously to in the case of the transmitter, but such that the synchronization of the test transmitter is constantly somewhat delayed in comparison to the transmitter. As a result, the receiver generates for each sensor pixel an output signal that corresponds to a distance that is longer than the length of the beam path between the LED of the test transmitter and the sensor chip and, in particular, corresponds to a distance in the central region of the extent of the monitoring area. The 3D map produced by the test transmitter is thus a 3D map that is virtually more remote in comparison with reality a. As a result, the processing of the distance value by the sensor can be simpler.

To produce the expectation value, the test transmitter transmits a test signal that is received by the receiver and evaluated by the evaluation device. The 3D map received in the process is approximately the same as a plane at a constant interval and is stored as an interval value in the memory as an expectation value. The expectation value can be read from the sensor and can be stored externally and averaged with multiple expectation values formed in this manner to produce an averaged expectation value. Sensors according to the present invention of the same type are loaded with this averaged expectation value externally, which means that production of the expectation value in these sensors can cease.

During operation of the sensor, the transmitter is interrupted approximately every 100 milliseconds, and during the pause by the transmitter the test transmitter sends the test signal of less than 1 millisecond duration. The receiver and the evaluation device detect and calculate the virtually more remote 3D map detected by the receiver, as specified above.

The comparison device 70 now accepts the virtually more remote 3D map of the test signal and compares the 3D surface thereof with the interval value of the expectation value. If the 3D surface of the 3D map of the test signal now differs from the expectation value by more than a predefined threshold value for a particular number of sensor pixels, then the comparison device outputs a safety signal. The safety signal has the effect that the sensor changes to a safe mode, outputs its error status for external identification and, until there is a reset, does not output measured values or commands on the basis of measured values.

LIST OF REFERENCE SIGNS

10 Sensor
11 Housing
12 Circuit boards
20 Transmitter
21 Transmitter electronics
22 VCSEL
23 Transmitter optical system
30 Test transmitter
31 Test transmitter electronics
32 LED
33 Beam path of the test signal
40 Receiver
41 Sensor chip
42 Receiver electronics
43 Receiver optical system
50 Evaluation device
60 Memory
70 Comparison device
80 Synchronization device

The invention claimed is:

1. A sensor for monitoring a monitoring area comprising:
a transmitter for transmitting radiation into the monitoring area for reflection at an object in the monitoring area;
a test transmitter for transmitting a test signal comprising radiation;
a receiver for receiving the radiation of the transmitter that is reflected at the object or the radiation of the test transmitter; and
a computer-implemented evaluation device comprising electronic components provided on a circuit board for ascertaining a distance value on the basis of the delay in the transit time or the phase of a modulation between the transmitted and received radiation of the sensor,
wherein the sensor further comprises a memory for storing an expectation value for the expected distance value of the received test signal, and a comparison device for comparing a distance value on the basis of the received test signal with the expectation value and for outputting a safety signal on the basis of the comparison,
wherein the sensor further comprises a computer-implemented synchronization device comprising electronic components provided on a circuit board for achieving synchronization between the transmitter and/or the test transmitter, on the one hand, and the receiver, on the other hand, wherein the synchronization device synchronizes the modulation and/or a pattern of the modulation and/or another pattern of the radiation of the transmitter and/or of the test transmitter with the receiver or synchronizes it/them with a particular time delay,
wherein the synchronization device transfers a synchronization trigger to the test transmitter later than the receiver by a time delay, and
wherein the expectation value is ascertained by a single or repeated reception of radiation from the test transmitter to simulate a time of flight for the radiation from the test transmitter to the receiver that is longer by the time delay.

2. The sensor according to claim 1, wherein the test transmitter is arranged for irradiating the receiver over an invariable distance, or for irradiation by means of invariable reflection.

3. The sensor according to claim 2, wherein the test transmitter is arranged for directly irradiating the receiver.

4. The sensor according to claim 2, wherein the test transmitter is arranged for irradiating the receiver by means of reflection at one or more surfaces inside the housing of the sensor.

5. The sensor according to claim 1, wherein the radiation of the transmitter and/or of the test transmitter is modulated.

6. The sensor according to claim 5, wherein the radiation of the transmitter and/or of the test transmitter is intensity modulated.

7. The sensor according to claim 5, wherein the radiation of the transmitter and/or of the test transmitter is modulated with 20 MHz.

8. The sensor according to claim 5, wherein the radiation of the transmitter and/or of the test transmitter is modulated with an IR radiation.

9. The sensor according to claim 1, wherein the receiver is designed as a receiver matrix with receiver matrix elements for receiving individual image element points for recording a 3D image.

10. The sensor according to claim 1, wherein the receiver is in the form of a receiver matrix, and wherein the evaluation device is designed to ascertain a value for individual or all receiver elements, or groups of receiver elements, in order to ascertain a 3D image.

11. The sensor according to claim 1, wherein the expectation value has a minimum value and a maximum value or a mean value as a threshold value, and has single values for some or each or groups of receiver matrix elements, and represents the shape of a plane or of a section of space that is bounded by two surfaces or planes.

12. The sensor according to claim 1, wherein the sensor is designed for activating the test transmitter instead of the transmitter by means of an activation signal for independently, periodically activating the test transmitter.

13. The sensor according to claim 12, wherein the test transmitter is activated every 100 milliseconds.

14. The sensor according to claim 1, wherein the sensor is designed for monitoring an opening area or a surrounding area of a door or gate.

15. The sensor according to claim 1, wherein the expectation value is ascertained by the evaluation device, and corresponds to a value or a function of multiple values of the evaluation device on reception of one or more test signals by the receiver.

16. The sensor according to claim 15, wherein the expectation value is an average of said multiple values.

* * * * *